July 22, 1969 F. L. DROTAR 3,456,972
FASTENED ASSEMBLY HAVING A HIGH RESISTANCE TO
VARYING SHEAR LOADS
Filed Feb. 27, 1967
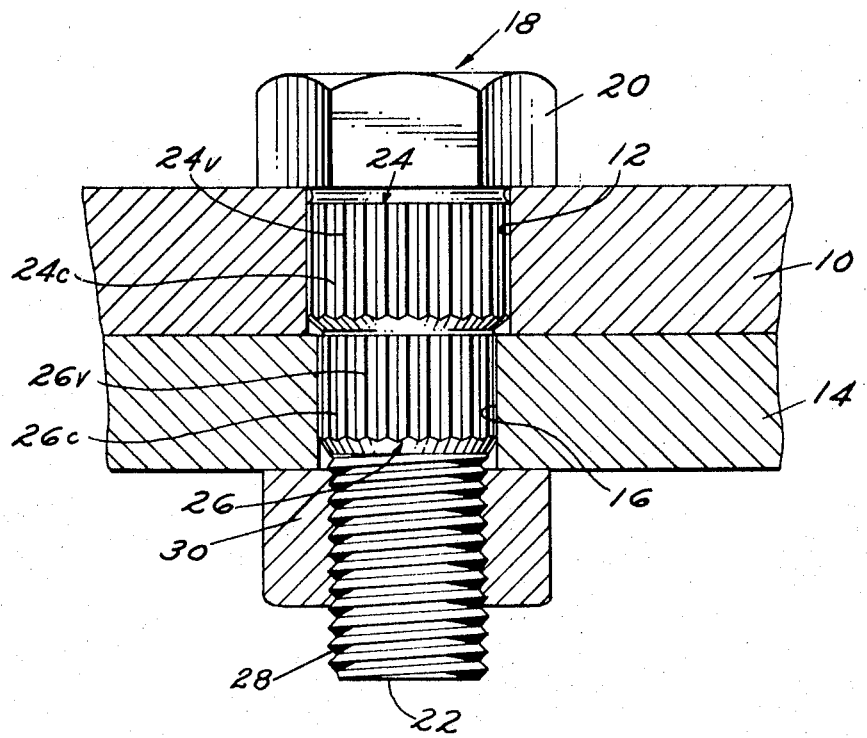
INVENTOR
FREDERICK L. DROTAR
BY John R. Faulkner
Glenn D. Arendsen
ATTORNEYS United States Patent Office 3,456,972
Patented July 22, 1969

3,456,972
FASTENED ASSEMBLY HAVING A HIGH RESISTANCE TO VARYING SHEAR LOADS
Frederick L. Drotar, Newport, Mich., assignor to Ford Motor Company, Dearborn, Mich., a corporation of Delaware
Filed Feb. 27, 1967, Ser. No. 618,675
Int. Cl. F16b *1/00, 39/00*
U.S. Cl. 287—189.36                        2 Claims

ABSTRACT OF THE DISCLOSURE

This fastened assembly has a threaded fastener holding two members that transmit varying shear loads thereto without permitting relative movement between the members. The fastener is a conventional bolt that has two finned portions of different diameters on its body. An interference fit exists between each finned portion and a hole in each member, and a threaded nut engages threads on the bolt body to clamp the assembly together. During assembly, the fins or the metal of the members is displaced to compensate for variations in the hole size or symmetry, thereby resisting mechanically the shear loads applied to the threaded fastener by the members. A reduction in bolt size and torque results.

Summary of the invention

In assemblies using conventional threaded fasteners to fasten members transmitting varying shear forces thereto, only the friction between the head and nut of the threaded fastener and the sides of the fastened members resists the shear forces. Varying shear forces soon overcome the friction and hole elongation results. In the past, this has been prevented by using larger bolts with higher clamp forces and by carefully controlling hole tolerances.

The fastened assembly provided by this invention has a positive mechanical interference between the members and the fastener that resists the shear forces physically. An increased resistance to initial slipping of the members is provided thereby. Both decreased clamp forces and wider hole tolerances are permitted with the assembly and the assembly remains low in cost and easy to manufacture and assemble. In addition, the bolt can be reduced by a full size while maintaining the same load characteristics.

This fastened assembly comprises a threaded fastener having a stop at one end, a first finned portion adjacent the stop having an outside diameter smaller than the stop, a second finned portion adjacent the first finned portion and having an outside diameter smaller than the outside diameter of the first finned portion, and screw threads adjacent the second finned portion. The screw threads have a major diameter smaller than the outside diameter of the second finned portion.

A first member is located adjacent the stop and the first finned portion has an interference fit into a hole formed in the first member that is slightly larger than the second finned portion. A second member having a hole therein slides easily over the threaded portion of the threaded fastener but has an interference fit with the second finned portion. Completing the assembly is a threaded nut threadably engaging the screw threads that is tightened while bearing on the second member to draw the finned portions into place and clamp the assembly together.

Either the fins of the finned portions or the metal surrounding the holes in the fastened members or both deforms during the assembly to provide a positive mechanical fit between the fastener and the members. Shear forces transmitted through the fastened members thus are resisted positively and the required clamping forces are reduced, thereby permitting the use of smaller fasteners.

Brief description of the drawing

The drawing is a sectional view of a fastened assembly of this invention showing the finned portions and their relationship to the fastened members.

Detailed description

Referring to the drawing, a first fastened member 10 having a hole 12 therein is located against a second fastened member 14 having a hole 16 therein. Hole 12 has a larger diameter than hole 16, and the holes are in substantial alignment with each other.

A threaded bolt indicated generally by the numeral 18 has a hexagon-shaped head 20 connected to a cylindrical body 22. Body 22 has a first finned portion 24 located adjacent head 20 and a second finned portion 26 located adjacent the first finned portion 24. Conventional screw threads 28 are formed on body 22 beginning adjacent second finned portion 26 and running out to the end of body 22.

The fins on both finned portions 24 and 26 are V-shaped with substantially sharp crests 24c and 26c at the outside diameter and pointed valleys 24v and 26v therebetween. All fins of both portions 24 and 26 run parallel to the axis of body 22. The diameter of the circle defined by the crests of finned portion 24 is larger than that of finned portion 26 and the diameter of hole 12; similarly, the diameter of the crests of finned portion 26 is larger than the diameter of hole 16. The amount of interference between the finned portions and the respective holes ranges from just above zero to over 10 percent and depends on a balance between desired shear resistance and ease of assembly. These factors in turn depend on the hardness of the members and the fins.

To assemble the fastened assembly, bolt 18 is inserted in holes 12 and 16 to the point where the interference between finned portion 24 and hole 12 resists further insertion. A threaded nut 30 then is turned on screw threads 28 and bears on member 14 to pull finned portions 24 and 26 into holes 12 and 16 until head 20, the stop, contacts, the surface of first member 10. Either the fins or the metal of members 10 and 14 deforms to permit this movement, with the deformation insuring a positive physical relationship between fastener 18 and members 12 and 14.

The deformation also compensates for misalignment of holes 12 and 16 ranging in amounts up to the sum of the radial depths of the fins on portion 24 and the fins on portion 26. Bolts having the outside diameter of the fins of the smaller finned portion equal to the diameter of the valleys 24v are capable of compensating for maximum hole misalignment while retaining maximum strength and are preferred for that reason.

During the manufacture of bolt 18, the fins on finned portions 24 and 26 and screw threads 28 can be rolled simultaneously. The number of fins on finned portion 26 can be greater than the number of fins on finned portion 24 to permit the simultaneous rolling. In a typical bolt, finned portion 24 contains from 15 to 19 fins about .030 inch deep with an outside diameter of about 0.510 inch while finned portion 26 contains from 30 to 38 fins about .025 inch deep with an outside diameter of about 0.485 inch. The finned portions of grade 8 bolts having the above dimensions and 7/16–14 screw threads can be drawn into members 10 and 14 with only about 5–10 foot pounds of torque. After tightening, the resulting fastened assembly withstands shear forces normally requiring a ½ or 9/16 inch conventional bolt.

In automotive front suspension systems, a strut providing fore-and-aft stability is attached to the control arms where it is subjected to high, varying shearing loads. Prior to this inventon, wear caused by the effects of the varying shear loads on loose fastener tolerances resulted in loss of the torque of the threaded fasteners holding the strut retainer to the control arm. Vibration then could loosen attachment of the strut to the control arm and result in excessive noise with ultimate loss of fore-and-aft stability.

The fastened assembly of this invention eliminates the loose tolerances and prevents torque loss even though smaller fasteners are used. In addiiton, a cost reduction usually results from the use of a smaller fastener.

Thus, this invention provides a fastened assembly having high resistance to varying shear loads that remains low in cost and easy to manufacture and assemble. In particular, the assembly is useful in any application where varying shear loads exist such as in the suspension systems of automotive vehicles.

What is claimed is:

1. A fastened assembly comprising
a threaded fastener having a stop at one end, a first finned portion located adjacent said stop having an outside diameter smaller than the stop, a second finned portion located adjacent said first finned portion and having an outside diameter substantially equal to the diameter of the valleys between the fins of the first finned portion, and screw threads located adjacent said second finned portion and having a major diameter smaller than the outside diameter of the second finned portion,
a first member located adjacent said stop and having a hole therein smaller than the first finned portion but larger than the second finned portion, said first finned portion being located in the hole in said first member,
a second member having a hole therein smaller than the second finned portion but larger than the major diameter of the screw threads, said second finned portion being located in the hole in said second member, and
a threaded nut threadably engaging the screw threads.

2. The fastened assembly of claim 1 in which the threaded fastener is a bolt and the stop is the head of the bolt.

References Cited

UNITED STATES PATENTS

| | | | |
|---|---|---|---|
| 1,969,796 | 8/1934 | Hoke | 85—1 |
| 1,988,925 | 1/1935 | Thomson | 85—1 |
| 2,358,728 | 9/1944 | Miller | 151—41.73 |

EDWARD C. ALLEN, Primary Examiner

U.S. Cl. X.R.

151—41.73